No. 820,905. PATENTED MAY 15, 1906.
J. W. BIRD.
MOTOR VEHICLE.
APPLICATION FILED JULY 22, 1905.
2 SHEETS—SHEET 1.
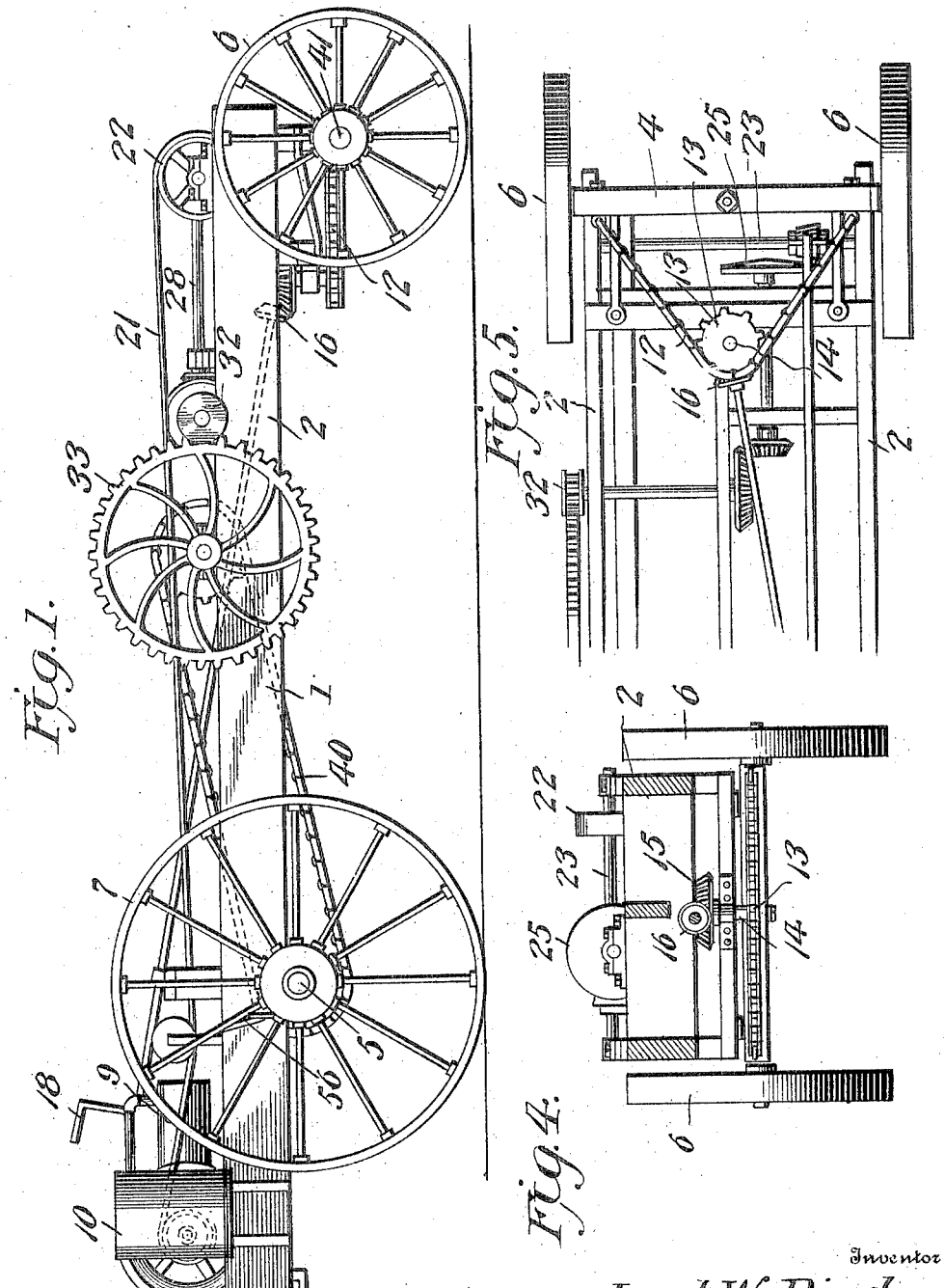
Witnesses
Geo. Ackman Jr.
C. C. Hines
Inventor
Jacob W. Bird
By Victor J. Evans
Attorney

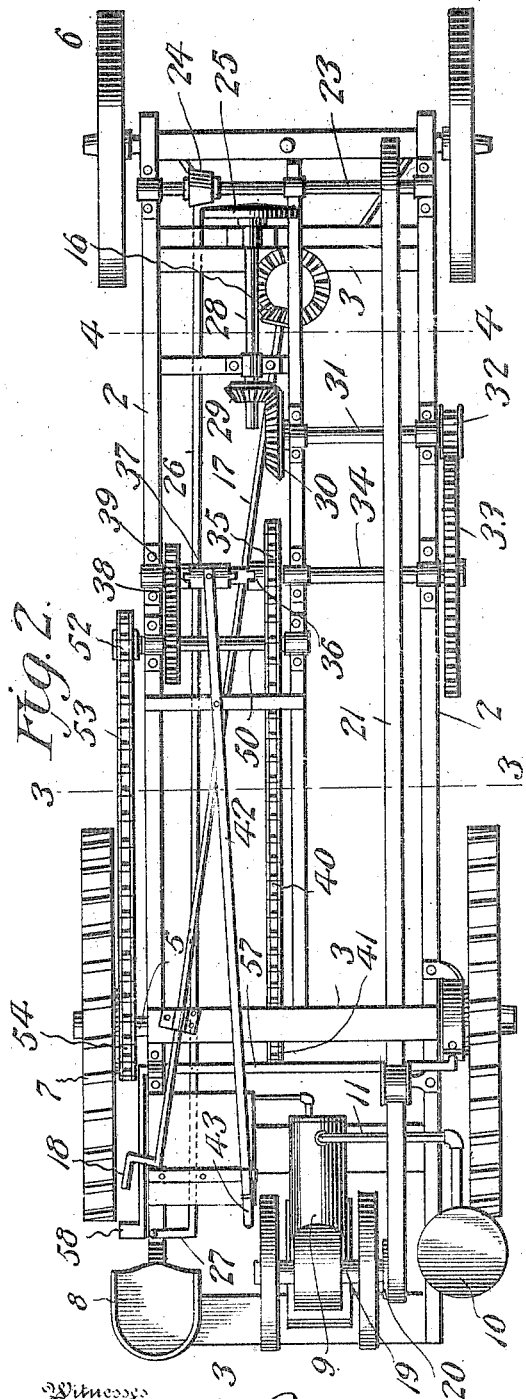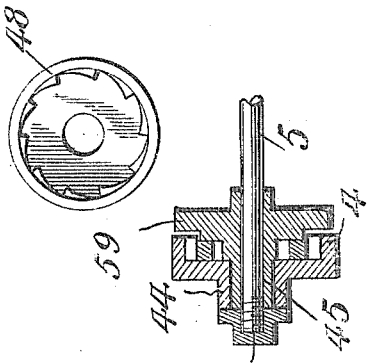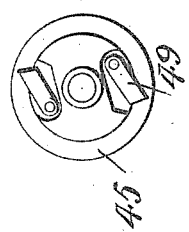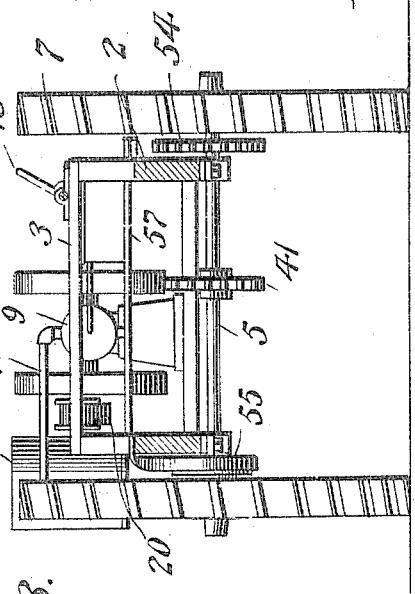

UNITED STATES PATENT OFFICE.

JACOB W. BIRD, OF TOWNSEND, TENNESSEE, ASSIGNOR OF ONE-HALF TO EDWARD GEORGE KEEBLE, OF TOWNSEND, TENNESSEE.

MOTOR-VEHICLE.

No. 820,905.

Specification of Letters Patent.

Patented May 15, 1906.

Application filed July 22, 1905. Serial No. 270,820.

*To all whom it may concern:*

Be it known that I, JACOB W. BIRD, a citizen of the United States of America, residing at Townsend, in the county of Blount and State of Tennessee, have invented new and useful Improvements in Motor-Vehicles, of which the following is a specification.

This invention relates to improvements in motor-vehicles, and particularly to a motor-driven dray, wagon, or similar vehicle which may be used for transporting goods or pushing or drawing various implements or laden vehicles.

The object of the invention is to provide a vehicle of this character which is especially adapted for farm and road use for hauling or transporting purposes, but in which novel features are provided which may be employed on any type of vehicle of this character, and which is simple of construction, adapted to yield high tractive power, and is susceptible of production at a comparatively low cost.

With the above and other objects in view the invention consists of the novel construction and combination of parts hereinafter fully described and claimed, reference being had to the accompanying drawings, in which—

Figure 1 is a side elevation of a motor-vehicle embodying my invention. Fig. 2 is a top plan view thereof. Fig. 3 is a cross-section on line 3 3 of Fig. 2. Fig. 4 is a cross-section on line 4 4 of Fig. 2. Fig. 5 is a bottom plan view of the front portion of the vehicle, showing the steering mechanism. Fig. 6 is a sectional view through one of the driving-wheels, showing the compensating clutch connection; and Figs. 7 and 8 are detail views of the members of the clutch connection.

Referring now more particularly to the drawings, the numeral 1 represents the bed or frame of the vehicle, shown in the present instance as comprising longitudinal side bars 2, connected at suitable points by transverse bars 3. On the frame are mounted front and rear axles 4 and 5, carrying supporting-wheels 6 and 7, the wheels 6 being employed as steering-wheels and the wheels 7 as driving or propelling wheels, the peripheries of the latter being preferably stepped or ribbed to prevent slipping on the ground, road, or street surface. At the rear of the frame is arranged a driver's seat 8 and a motor or engine 9, which latter may be of any preferred type. In the present instance I have shown a gasolene-motor supplied with fuel from a storage-tank 10, through a fuel-supply pipe 11.

The front axle 4 is provided at its ends with journals or spindles on which the steering-wheels 6 are revolubly mounted. To the ends of the axle are connected the ends of a sprocket-chain 12, which passes around a sprocket-wheel 13, mounted upon the lower end of a steering-shaft 14, journaled on the frame, and which carries at its upper end a bevel-gear 15, meshing with a bevel-pinion 16 on a steering-lever 17. The lever 17 is journaled in suitable bearings on the frame and extends rearwardly to a point adjacent the driver's seat 8, where it is provided with an operating-handle 18, by which it may be turned in one direction or the other to oscillate the shaft 14, and thereby swing the axle 4 to guide the vehicle.

The engine or motor shaft 19 carries a pulley 20, which is connected by a drive-belt 21 with a pulley 22 on a drive-shaft 23, journaled in bearings at the front of the frame and extending transversely across the frame. On the shaft 23 is a friction-gear 24, which is keyed or splined thereto to slide thereon and rotate therewith and is adapted to be shifted into and out of engagement with a friction-gear 25 through the medium of a shifting-lever 26, extending rearwardly to a point in proximity to the driver's seat 8, where it is provided with an operating-handle 27.

The friction-gear 25 is carried by a short shaft 28, extending longitudinally of the frame and journaled in bearings thereon immediately in rear of the drive-shaft 23, said shaft 28 carrying at its rear end a bevel-gear 29, meshing with a corresponding gear 30 on the inner end of a transverse shaft 31, provided at its outer end with a spur-pinion 32. The pinion 32 meshes with a gear-wheel 33 on a transverse power-transmitting shaft 34, journaled in bearings about centrally of the frame 1. On said shaft 34 a sprocket-wheel 35 is loosely mounted and is provided with a clutch member 36, adapted to be engaged by a sliding bevel clutch-sleeve 37, movable on the shaft between said sprocket-wheel 36 and a spur-pinion 38, which latter is also provided with a clutch member 39. The sleeve 37 is adapted to occupy a neutral position between the two clutch members 36 and 39 or to be shifted in one direction to be engaged with the member 36 or in the opposite direction to be engaged with the member 39 to connect one or the other of the gears 35 or 38 with the shaft 34. These gears form elements of forward driving and reversing mechanism adapted to respectively transmit direct motion to the shaft 3 or indirectly to said shaft through one of the driving-wheels 7. The forward propelling mechanism comprises a sprocket-chain 40, which passes at its forward end around the sprocket-wheel 36 and at its rear end around a sprocket-wheel 41, rigidly mounted on the rear shaft 5. The shaft 23 is driven in a forward direction by the belt 21 and through the intervening mechanism transmits corresponding motion to the shaft 34, which through the sprocket-gearing also drives the shaft 5 forwardly, thus imparting forward motion to the vehicle. The shaft 23 is continuously driven from the motor 9 and may be thrown into and out of connection with the power-transmitting shaft 34 through the friction-gears 24 and 25 to start or stop the motion of the vehicle, the direction of motion of which is controlled through the forward propelling mechanism before described and the reversing mechanism hereinafter described and of which the gear 38 forms the driving part. The clutch-sleeve 37 is adapted to be shifted in one direction or the other by a pivoted operating-lever 42, which extends rearwardly therefrom and is provided with an operating-handle 43, adjacent to the driver's seat 8.

Each driving-wheel 7 is rigidly mounted on a hub 44, journaled on a bearing sleeve or spindle 45, fixed on the shaft 5, said parts being retained in position by a retaining-nut 46. (See Fig. 6). Each hub 44 is provided with a circumferential flange 47, forming a chamber provided with internal ratchet-teeth 48, adapted to be engaged by pawls or dogs 49, carried by the stationary spindle or sleeve 45. The shoulders of the ratchet-teeth 48 project rearwardly in the direction of rotation of the wheel and are normally engaged by the dogs or pawls 49 to connect the hub and wheel with the axle, so that the wheels will turn forwardly with the axle when motion is communicated thereto. This construction provides a compensating clutch connection between each wheel and the rear axle to facilitate turning of the vehicle, the clutch connection of the pivot-wheel maintaining rigid engagement of the same with the axle, while the clutch connection of the other or turning wheel, which moves faster and describes a greater arc, permits more rapid motion of said wheel, as the ratchet-teeth of the hub are permitted to slip over the pawls.

The reversing mechanism driven by the gear 38 comprises a transverse shaft 50, arranged immediately in rear of the shaft 34 and provided with a gear-wheel 51, which meshes with the gear 38 and a sprocket-pinion 52, which latter is connected by a sprocket-chain 53 with ratchet-teeth 54 on the hub 44 of one of the driving-wheels 7, whereby when the gear 38 is connected with the shaft 34 through the clutch-sleeve 37 rearward motion will be imparted to said wheel 7 to propel the vehicle backward, the direction of movement of the vehicle when so propelled being controlled through the instrumentality of the steering mechanism. This reversing-gearing is principally employed to back the vehicle out of confined spaces and to facilitate the turning thereof. It will thus be seen that the vehicle may be driven forwardly by connecting the power-transmitting shaft with the rear axle, or that it may be driven rearwardly by connecting said power-transmitting shaft with one of the rear driving-wheels. When the driving-wheel is turned rearwardly it will of course, be understood that the shoulders of the ratchet-teeth 48 will engage the pawls 49 and thus communicate motion to the shaft 5 and to the other driving-wheel through its clutch connection.

The vehicle may be stopped and controlled in descending grades by the reversing mechanism and by means of a brake acting on the shaft 5. This brake comprises a brake strap or band 55, fixed at one end to the frame 1 and connected at its opposite or free end with the crank-arm 56 of a transverse brake-lever 57, having a controlling crank arm or handle 58. The brake band or strap 55 is adapted to engage a disk or head 59, carried by the stationary bearing sleeve or clutch member 45 of the companion wheel 7 of the one connected with the reversing-gearing.

It will be observed that the handles of all of the controlling levers or devices are arranged in juxtaposition to the driver's seat 8, so that the operation of the vehicle may be conveniently controlled in all cases by the driver without moving from his seat; also, that the driving mechanism is comparatively simple and adapted to yield comparatively high power.

The invention provides a motor-vehicle or traction-engine which is especially adapted for road and farm work for hauling or pushing vehicles or farm implements or which may be constructed with a suitable platform to adapt it for use as a dray; but the various elements of the invention may be employed upon motor-vehicles of any character.

Having thus described the invention, what is claimed as new is—

1. In a motor-vehicle, a driving-axle, wheels mounted thereon, a compensating clutch connection between each wheel and the axle, means for imparting direct motion to the axle to rotate the wheels in one direction, and means for communicating motion to one of the wheels and to the axle and other wheel through said compensating clutch connections to drive the same in the opposite direction.

2. In a motor-vehicle, a driving-axle, wheels mounted thereon, a motor, means for directly connecting the axle with the motor to drive the wheels in one direction, and means for indirectly connecting the motor to the axle through one of the wheels to drive the wheels in the reverse direction.

3. In a motor-vehicle, a driving-axle, wheels mounted thereon, a compensating clutch connection between each wheel and the axle, a driving-shaft, a power-transmitting shaft, gearing for connecting the driving-shaft with the power-transmitting shaft, and sets of gearing for connecting the power-transmitting shaft with the driving-axle or one of the wheels, and means for throwing said sets of the gearing into and out of operation at will.

4. In a motor-vehicle, a driving-axle, wheels mounted thereon, a compensating clutch connection between each wheel and the axle, a power-transmitting shaft, means for driving the same, sets of gearing for connecting said shaft with the axle or one of the wheels, and means for throwing either set of gearing into and out of operation at will.

5. In a motor-vehicle, a driving-axle, wheels mounted thereon, a compensating clutch connection between each wheel and the axle, a power-transmitting shaft, sets of gearing for connecting said shaft with the axle and one of the wheels, and clutch mechanism shiftable in opposite directions for connecting the shaft with either set of gearing at will.

6. In a motor-vehicle, a driving-axle, wheels mounted thereon, a compensating clutch connection between each wheel and the axle, a drive-shaft, a power-transmitting shaft, gearing connecting the drive-shaft with the power-transmitting shaft, means for throwing said gearing into and out of operation at will, sets of gearing connecting the power-transmitting shaft with the axle and one of the wheels thereon, and means for throwing either of said sets of gearing into and out of operation at will.

7. In a motor-vehicle, a driving-axle, wheels mounted upon the axle, a compensating clutch connection between each wheel and the axle, said clutch connection comprising members respectively connected with the axle and wheel, said members adapted to alternately operate as driving members when motion is imparted to the axle or wheel to drive the axle in reverse direction, means for communicating motion to the axle in one direction, means for communicating motion to the wheel in the reverse direction, and means for throwing either of said motion-communicating means into and out of operation at will.

In testimony whereof I affix my signature in presence of two witnesses.

JACOB W. BIRD.

Witnesses:
W. H. DUNN,
PAT DUNN.